United States Patent
Yoneshima

(10) Patent No.: US 9,929,687 B2
(45) Date of Patent: Mar. 27, 2018

(54) MOTOR CONTROL DEVICE

(71) Applicant: DENSO CORPORATION, Kariya, Aichi-pref. (JP)

(72) Inventor: Hiroko Yoneshima, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 15/315,044

(22) PCT Filed: Oct. 8, 2015

(86) PCT No.: PCT/JP2015/005110
§ 371 (c)(1),
(2) Date: Nov. 30, 2016

(87) PCT Pub. No.: WO2016/059779
PCT Pub. Date: Apr. 21, 2016

(65) Prior Publication Data
US 2017/0194890 A1    Jul. 6, 2017

(30) Foreign Application Priority Data

Oct. 17, 2014    (JP) ................... 2014-212974

(51) Int. Cl.
*H02P 6/00* (2016.01)
*H02P 23/04* (2006.01)
(Continued)

(52) U.S. Cl.
CPC ............. *H02P 23/04* (2013.01); *G05B 13/00* (2013.01); *G05B 19/00* (2013.01); *H02P 7/00* (2013.01)

(58) Field of Classification Search
CPC .. H02P 3/12; H02P 3/22; H02P 29/024; H02P 3/14; H02P 21/36; H02P 23/0086; H02P 23/009
(Continued)

(56) References Cited

U.S. PATENT DOCUMENTS

2002/0043946 A1    4/2002    Yoshimura
2006/0290304 A1*   12/2006   Marcinkiewicz ..... H02P 21/141
                                                              318/432
(Continued)

FOREIGN PATENT DOCUMENTS

JP    2000-252419 A    9/2000
JP    2001-178190 A    6/2001
(Continued)

*Primary Examiner* — Bickey Dhakal
(74) *Attorney, Agent, or Firm* — Posz Law Group, PLC

(57) ABSTRACT

A motor control device includes: a motor; an inverter; and a control device. The control device includes: a detection device detecting a rotational position and a revolution speed of the motor; a positioning control device for a rotor; a deceleration device for the motor; and a determination device for the revolution speed of the motor. When the revolution speed is higher than or equal to the first predetermined revolution speed, the motor control device starts controlling the motor to rotate at the target speed, according to the rotational position, without executing the positioning control. When the revolution speed is lower than the first predetermined revolution speed and higher than or equal to the second predetermined revolution speed, the deceleration device decelerates the motor. When the revolution speed is lower than the second predetermined revolution speed, the positioning control device starts executing the positioning control.

10 Claims, 11 Drawing Sheets

(51) Int. Cl.
*H02P 7/00* (2016.01)
*G05B 13/00* (2006.01)
*G05B 19/00* (2006.01)

(58) Field of Classification Search
USPC .................................................. 318/400.32
See application file for complete search history.

(56) References Cited

U.S. PATENT DOCUMENTS

| | | | | |
|---|---|---|---|---|
| 2006/0290312 | A1* | 12/2006 | Nagai | H02P 25/024 |
| | | | | 318/599 |
| 2007/0063666 | A1* | 3/2007 | Kubo | H02P 21/34 |
| | | | | 318/807 |
| 2007/0194731 | A1* | 8/2007 | Fukamizu | H02P 6/182 |
| | | | | 318/400.09 |
| 2010/0148710 | A1* | 6/2010 | Lim | H02P 6/20 |
| | | | | 318/400.11 |
| 2011/0132292 | A1 | 6/2011 | Schwarts et al. | |
| 2014/0156130 | A1* | 6/2014 | Ogawa | B60L 3/04 |
| | | | | 701/22 |

FOREIGN PATENT DOCUMENTS

| | | |
|---|---|---|
| JP | 2003-204686 A | 7/2003 |
| JP | 2011-050183 A | 3/2011 |
| JP | 2011-223741 A | 11/2011 |
| JP | 2012-130091 A | 7/2012 |
| JP | 2014-007916 A | 1/2014 |

* cited by examiner

MOTOR CONTROL DEVICE

CROSS REFERENCE TO RELATED APPLICATIONS

This application is the U.S. national stage of International Patent Application No. PCT/JP2015/005110 filed on Oct. 8, 2015 and is based on Japanese Patent Application No. 2014-212974 filed on Oct. 17, 2014, the disclosure of which is incorporated herein by reference.

TECHNICAL FIELD

The present disclosure relates to a motor control device.

BACKGROUND ART

As disclosed in patent literature 1, for example, a flow of air generated during vehicle running rotates a motor to drive a vehicular cooling fan at a revolution speed higher than or equal to a predetermined value. In this case, a control device for the vehicular cooling fan switches MOSFET at a predetermined frequency to regenerate the energy generated by the motor when the MOSFET is provided for a lower arm of an inverter.

The control device for the vehicular cooling fan receives no directive to drive the cooling fan from an engine control device. The control device provides regeneration control when the motor revolution speed is higher than or equal to a predetermined value under the condition that a battery is not fully charged. The predetermined value to determine the motor revolution speed is configured to be a revolution speed capable of regenerating more energy than at least the energy used for the regeneration control to effectively improve an electric power balance. The control device according to patent literature 1 includes a position sensor to detect a magnetic pole position of a motor rotor in order to determine whether the regeneration control is feasible based on the motor revolution speed.

However, provision of the position sensor increases the number of parts and costs. The position sensor is used with difficulty and is less durable under poor conditions.

A publicly known technology can detect a magnetic pole position of the motor rotor without using sensors based on an induced electromotive force of an idle coil when the motor is driven. For this reason, the position sensor may be eliminated from the apparatus according to patent literature 1.

However, the following issue may arise if the position sensor is eliminated. A flow of air generated during vehicle running rotates the cooling fan and also the motor while the motor stops. If the control device for the cooling fan does not include the position sensor, the control device for the cooling fan cannot determine a magnetic pole position of the motor rotor when receiving a drive directive. To drive the motor, the control device for the cooling fan needs to first energize a specified energization phase, perform positioning control to position the rotor to a predetermined angle position, and then perform forced commutation to sequentially changes energization patterns.

As a result, eliminating the position sensor necessitates a long time to allow the motor to transition from a non-driving state to a driving state. In contrast, the control device for the cooling fan needs to start driving the cooling fan as soon as possible to cool objects to be cooled such as a radiator when receiving a drive directive from a higher-order engine control device.

PRIOR ART LITERATURES

Patent Literature

Patent Literature 1: JP-2002-61512 A

SUMMARY OF INVENTION

It is an object of the present disclosure to provide a motor control device that can start driving a motor as soon as possible without using sensors in response to receiving a directive to drive the motor when the motor rotates while stopping.

According to an aspect of the present disclosure, a motor control device includes: a motor including a plurality of energization phases; an inverter that individually controls energization of each of the energization phases for the motor; and a control device that controls a rotation of the motor via the inverter. The control device includes: a detection device that detects a rotational position and a revolution speed of the motor without using a sensor; a positioning control device that positions a rotor at a predetermined position by energizing a predetermined energization phase of the motor; a deceleration device that decelerates the motor by short-circuiting a plurality of energization phases of the motor via the inverter; and a determination device that determines whether the revolution speed of the motor detected by the detection device is higher than or equal to a first predetermined revolution speed or a second predetermined revolution speed, when rotating the motor at a predetermined target speed, the first predetermined revolution speed ensuring a predetermined accuracy of the rotational position for the detection device, and the second predetermined revolution speed for determine whether a positioning control of the positioning control device is executed being lower than the first predetermined revolution speed. The motor control device starts controlling the motor to rotate at the target speed, according to the rotational position of the motor detected by the detection device, without executing the positioning control in the positioning control device when the determination device determines that the revolution speed of the motor is higher than or equal to the first predetermined revolution speed. The motor control device controls the deceleration device to decelerate the motor when the determination device determines that the revolution speed of the motor is lower than the first predetermined revolution speed and higher than or equal to the second predetermined revolution speed. The motor control device controls the positioning control device to start executing the positioning control when the determination device determines that the revolution speed of the motor is lower than the second predetermined revolution speed.

Some detection devices detect the rotational position of a motor without using sensors. Generally, such a detection device cannot or can inaccurately detect the rotational position of the motor when the motor stops or rotates at low speed. However, the detection device can sufficiently accurately detect the rotational position of the motor if the motor increases a revolution speed.

To solve this, the above-mentioned motor control device determines whether the revolution speed of the motor is higher than or equal to the first predetermined revolution speed when the motor needs to be rotated at a target speed. If the revolution speed is higher than or equal to the first predetermined revolution speed, the motor control device does not perform positioning control and starts motor control based on the rotational position of the motor detected by the detection device. The motor need not stop before the control starts to rotate the motor at the target speed. The motor control can start immediately.

Changing the revolution speed of the motor to be lower then the first predetermined revolution speed decreases the accuracy for the detection device to detect the rotational position of the motor. It is impossible to directly transition to sensorless motor drive control. However, unconditionally performing the positioning control may cause an issue as follows. Each stator coil generates an induced electromotive force when the motor rotates. Suppose that the positioning control is performed to position the rotor at a predetermined position by energizing a predetermined energization phase. Then, an energization current to the specific phase and an induced current due to the induced electromotive force may allow a large current to flow depending on the energization timing. Such a large current allowed to flow may apply a demagnetizing current to the motor or damage the drive circuit including the inverter of the motor.

To solve this, the above-mentioned motor control device uses the second predetermined revolution speed ensuring the allowable current magnitude even if the positioning control causes an opposite phase between the energization current to the specific phase and the induced current due to the induced electromotive force. The motor control device may determine that the revolution speed of the motor is lower than the first predetermined revolution speed and is higher than or equal to the second predetermined revolution speed. In this case, the motor control device decelerates the motor by short-circuiting the energization phases of the motor. The motor control device starts the positioning control when the revolution speed of the motor changes to be lower than the second predetermined revolution speed as a result of the deceleration.

The motor control device can prevent excess current from flowing through the motor or the drive circuit by performing the positioning control. The motor control device starts the positioning control when the revolution speed of the motor changes to be smaller than second predetermined revolution speed. The motor control device can start the positioning control as soon as possible and shorten the time the motor consumes to transition from a non-driving state to a driving state.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
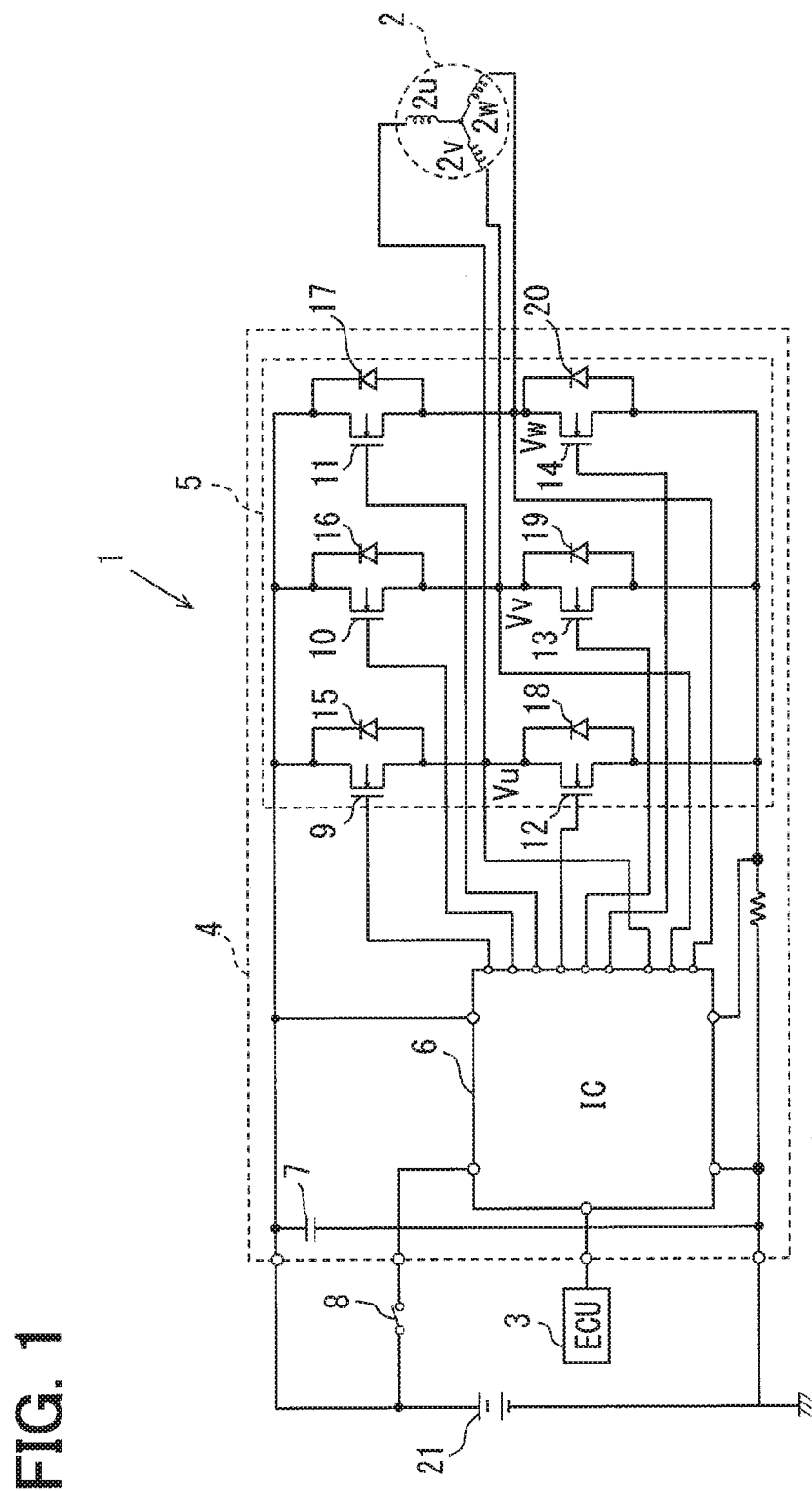
FIG. 1 is a configuration diagram illustrating a configuration of a motor control device according to an embodiment.

The description below explains the motor control device according to an embodiment of the present disclosure in detail with reference to the accompanying drawings. FIG. 1 is a configuration diagram illustrating a configuration of a motor control device 1 according to the embodiment. A motor 2 according to the embodiment drives a cooling fan (unshown) to cool a condenser or a radiator. A refrigerant for a vehicular air conditioner passes through the condenser. A coolant passes through the radiator. The motor 2 may rotate though not driven when a vehicle travels to supply air to the cooling fan.

In FIG. 1, the motor control device 1 mainly includes a brushless motor 2 to rotatively drive the cooling fan, an electronic control unit (ECU) 3, and a drive circuit 4.

The brushless motor 2 includes a stator and a rotor. A U-phase coil $2u$, a V-phase coil $2v$, and a W-phase coil $2w$ are wound around the stator. The rotor includes a permanent magnet. The cooling fan is attached to a rotary shaft of the rotor. Each of the phase coils $2u$, $2v$, and $2w$ is connected to a midpoint of an arm corresponding to each phase of the inverter 5 in the drive circuit 4.

The ECU 3 outputs the target number of revolutions (namely, target speed) per unit time of the brushless motor 2 to the drive circuit 4 when the engine coolant temperature changes to a predetermined temperature or higher, for example. The drive circuit 4 then applies feedback control to the inverter 5 to supply an electric current to rotatively drive the brushless motor 2 so that the revolution speed of the brushless motor 2 equals the specified target speed.

The drive circuit 4 includes an inverter 5 and an IC 6 that generates a drive signal to drive the inverter 5. The drive circuit 4 operates on the power supplied from an onboard battery 21. Namely, the IC 6 of the drive circuit 4 is connected to the onboard battery 21 via an ignition switch 8.

Suppose that the arm corresponding to each phase of the inverter 5 is divided into a high side and a low side. The high side is connected to a positive electrode of the onboard battery 21. The low side is connected to a negative electrode of the onboard battery 21. Therefore, turning on the ignition switch 8 enables the IC 6 to output a drive signal to drive the inverter 5. The drive signal drives each switching device of the inverter 5 to turn on or off. The drive circuit 4 also includes a capacitor 7 that is connected to the onboard battery 21 in parallel to stabilize the power supply.

The IC 6 of the drive circuit 4 includes a function to detect a magnetic pole position of the rotor of the brushless motor 2 without using sensors. For example, the motor control device 1 according to the embodiment drives the brushless motor 2 based on a 120-degree conduction system. One coil is always placed into a non-energized state when the brushless motor 2 is driven. The non-energized coil (hereinafter referred to as an idle coil) changes to another coil each time rotation occurs at an electric angle of 60 degrees. The idle coil can detect an induced electromotive force due to the rotor rotation. The induced electromotive force of the coil corresponding to each phase varies with the magnetic pole position of the rotor. The magnetic pole position of the rotor can be detected based on the detected induced electromotive force.

The description below briefly explains a configuration to detect the induced electromotive force in the idle coil. The IC 6 is supplied with the virtual neutral potential of the brushless motor 2 and is supplied with a terminal voltage at each of phase coils $2u$, $2v$, and $2w$ depicted by reference symbols Vu, Vv, and Vw in FIG. 1, respectively. The IC 6 includes a comparator that compares the supplied virtual neutral potential with each of terminal voltages Vu, Vv, and Vw corresponding to the phases. The IC 6 can detect induced electromotive forces of phase coils $2u$, $2v$, and $2w$ based on comparison results from the comparator. As a result, the IC 6 can detect the magnetic pole position of the rotor.

A configuration to detect the magnetic pole position of the rotor without using sensors is not limited to the above-mentioned configuration but may be embodied otherwise. For example, a possible configuration may detect an induced current flowing through each phase corresponding to the induced electromotive force and detect the magnetic pole position of the rotor based on the detected induced current.

The IC 6 of the drive circuit 4 calculates a revolution speed of the brushless motor 2 based on a temporal change in the detected induced electromotive force or Induced current. The IC 6 determines a duty ratio of a PWM signal as a drive signal for the inverter 5 based on a difference between the target speed supplied from the ECU 3 and the detected revolution speed. The IC 6 uses the PWM signal corresponding to the determined duty ratio to PWM-drive the switching device for the arm corresponding to each phase of the inverter 5. The brushless motor 2 is thereby rotatively driven so as to equal the target speed.

The inverter 5 of the drive circuit 4 includes N-channel type MOSFETs 9 through 14 as switching devices that configure an inverter. The MOSFETs 9 through 14 include freewheeling diodes 15 through 20, respectively. The freewheeling diodes 15 through 20 are built in the MOSFETs 9 through 14, respectively, according to the embodiment that uses the MOSFET as a switching device.

The MOSFETs 9 through 11 and the freewheeling diodes 15 through 17 provided for the high side of the arm corresponding to each phase configure an upper arm of the arm corresponding to each phase. The MOSFETs 12 through 14 and the freewheeling diodes 18 through 20 provided for the low side of the arm corresponding to each phase configure a lower arm of the arm corresponding to each phase. As above, the midpoint of each of the U-phase, V-phase, and W-phase arms of the inverter 5 is connected to each of U-phase, V-phase, and W-phase coils $2u$, $2v$, and $2w$ of the brushless motor 2.

There may be a case to PWM-drive the MOSFETs 9 through 14 corresponding to each phase of the inverter 5. According to the embodiment, the IC 6 of the drive circuit 4 allows the MOSFETs 9 through 11 for the upper arm to remain turned on during an energization period. The IC 6 outputs a PWM signal only to the MOSFETs 12 through 14 for the lower arm. The IC 6 may PWM-drive the MOSFETs 9 through 11 for the upper arm instead of the MOSFETs 12 through 14 for the lower arm. Moreover, the IC 6 may PWM-drive the MOSFETs 9 through 11 for the upper arm and the MOSFETs 12 through 14 for the lower arm.

The description below explains a characteristic of the motor control device 1 according to the embodiment. The brushless motor 2 is connected to the cooling fan. The brushless motor 2 rotates along with the cooling fan when the cooling fan rotates due to the wind generated while the vehicle travels. Rotating the brushless motor 2 causes phase coils $2u$, $2v$, and $2w$ to generate an induced electromotive force in accordance with the rotation of the brushless motor 2. Even when the brushless motor 2 is not driven, the IC 6 of the drive circuit 4 can detect the revolution speed of the brushless motor 2 based on a temporal change in comparison results from the comparator.

The motor control device 1 according to the embodiment detects the revolution speed of the brushless motor 2 based on the induced electromotive force generated from phase coils $2u$, $2v$, and $2w$ while the brushless motor 2 is not driven. When the ECU 3 supplies a target speed, the motor control device 1 is characterized by being able to transition to sensorless driving as soon as possible by changing a procedure to transition to sensorless driving of the brushless motor 2 in accordance with the detected revolution speed.

In terms of this characteristic, the description below explains a control process performed in the motor control device 1 with reference to a flowchart in FIG. 2. The IC 6 mainly performs the process depicted by the flowchart in FIG. 2.

At S100, the IC 6 determines whether an ignition switch of the vehicle is turned on. Turning on the ignition switch enables operation of the drive circuit 4 including the IC 6 as above. If the determination at S100 results in "Yes," the IC 6 proceeds to the process at S110. If the determination at S100 results in "No," the IC 6 terminates the process depicted by the flowchart in FIG. 2.

At S110, the IC 6 detects a revolution speed of the brushless motor 2 based on a temporal change in comparison results from the comparator. At S120, the IC 6 determines whether the ECU 3 inputs a directive to specify a target speed. If the determination at S120 results in "Yes," the IC 6 proceeds to the process at S130. If the determination at S120 results in "No," the IC 6 proceeds to the process at S210.

At S130, the IC 6 determines whether the revolution speed detected at S110 is higher than or equal to first predetermined revolution speed N1. If the determination at S130 results in "Yes," the IC 6 proceeds to the process at S140 and detects a rotational position of the brushless motor 2 based on a comparison result from the comparator. At S145, the IC 6 starts sensorless driving control of the brushless motor 2 based on the detected rotational position.

The IC 6 cannot detect a signal for the induced electromotive force or the induced current generated from phase coils 2u, 2v, and 2w when the brushless motor 2 stops. The signal magnitude is small when the brushless motor 2 rotates at a low revolution speed. A signal such as the induced electromotive force is subject to an effect such as noise when the brushless motor 2 rotates at a low speed. A comparison result from the comparator is subject to error. However, increasing the revolution speed of the brushless motor 2 also increases the signal magnitude and accordingly improves the accuracy of comparison results from the comparator. A comparison result from the comparator varies with the magnetic pole position (rotational position of the brushless motor 2) of the rotor. Improving the accuracy of a comparison result from the comparator also improves the accuracy of detecting a rotational position of the brushless motor 2.

The embodiment defines first predetermined revolution speed N1 as a revolution speed capable of ensuring the accuracy of detecting a rotational position when the rotational position of the brushless motor is detected from a comparison result from the comparator. The accuracy of detecting a rotational position of the brushless motor 2 can be fully ensured when the detected revolution speed is higher than or equal to first predetermined revolution speed N1. Sensorless driving of the brushless motor 2 starts directly. There is no need to once stop the brushless motor 2 before starting the control to rotate the brushless motor 2 at the target speed. Therefore, the IC 6 can start the sensorless driving control of the brushless motor 2 immediately after receiving a directive to specify the target speed from the ECU 3.

If the determination at S130 results in "No," the IC 6 proceeds to the process at S150. At S150, the IC 6 determines whether the detected revolution speed is higher than or equal to second predetermined revolution speed N2 that is smaller than the above-mentioned first predetermined revolution speed N1. If the determination at S150 results in "Yes," the IC 6 proceeds to the process at S160 and short-circuits phase coils 2u, 2v, and 2w of the brushless motor 2 to decelerate the brushless motor 2 (to perform short-circuit brake). At S165, the IC 6 detects the revolution speed of the brushless motor 2 decelerated by the short-circuit brake and returns to the process at S150. If the determination at S150 results in "No," the IC 6 proceeds to the process at S170 and energizes a specific phase of the brushless motor 2 to perform positioning control that forcibly places the rotor at a predetermined initial position.

Changing the revolution speed of the brushless motor 2 to be lower than first predetermined revolution speed N1 degrades the accuracy of detecting a rotational position of the brushless motor 2 based on a comparison result from the comparator described above. Direct transition to the sensorless driving control may be incapable of performing drive control that enables the brushless motor 2 to rotate smoothly. In this case, the positioning control needs to be performed to place the rotor at the predetermined initial position and perform forced commutation that rotates the rotor from the initial position.

However, unconditionally performing the positioning control may cause an issue as follows. When the brushless motor 2 rotates, phase coils 2u, 2v, and 2w each generate an induced electromotive force. If the positioning control energizes a specific phase, an energization current to the specific phase and an induced current due to the induced electromotive force may allow a large current to flow depending on the energization timing. Such a large current allowed to flow may apply a demagnetizing current to the brushless motor 2 or damage the drive circuit 4 including the inverter 5 of the motor.

As a solution, the motor control device 1 according to the embodiment defines second predetermined revolution speed N2 as a revolution speed allowing the flow of only a current whose magnitude is allowable to avoid the above-mentioned issue resulting from the energization current to the specific phase and the induced current due to the induced electromotive force. As above, the revolution speed of the brushless motor 2 may be smaller than first predetermined revolution speed N1. In this case, the IC 6 determines whether the revolution speed exceeds second predetermined revolution speed N2. The revolution speed may exceed second predetermined revolution speed N2. In this case, the IC 6 performs the short-circuit brake to decelerate the brushless motor 2. The IC 6 starts the positioning control when the short-circuit brake changes the revolution speed of the brushless motor 2 to be smaller than second predetermined revolution speed N2.

The IC 6 can prevent excess current from flowing through the brushless motor 2 or the drive circuit 4 by performing the positioning control. The IC 6 starts the positioning control when the revolution speed of the brushless motor 2 changes to be smaller than second predetermined revolution speed N2. The IC 6 can start the positioning control as soon as possible and shorten the time the brushless motor 2 consumes to transition from the non-driving state to a sensorless driving state.

Figure 3:
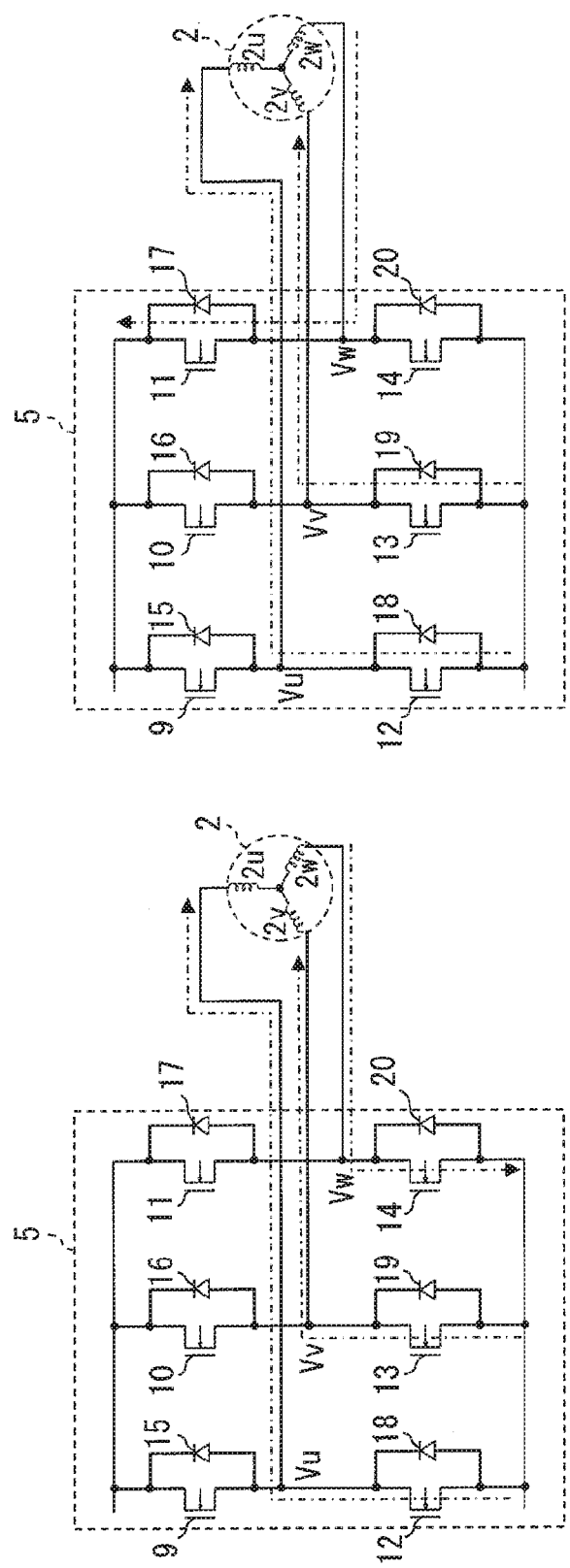
FIG. 3A is a circuit diagram illustrating a current pathway when MOSFET for a lower arm is turned on to short-circuit each phase coil of a brushless motor.
FIG. 3B is a circuit diagram illustrating a current pathway when MOSFET for the lower arm is turned off from the state in FIG. 3A.

The short-circuit brake will be described. FIG. 3A is a circuit diagram illustrating a current pathway when phase coils 2u, 2v, and 2w of the brushless motor 2 are short-circuited. As illustrated in FIG. 3A, the embodiment short-circuits phase coils 2u, 2v, and 2w of the brushless motor 2 by turning off all the MOSFETs 9 through 11 for the upper arm and turning on all the MOSFETs 12 through 14 for the lower arm. As illustrated in FIG. 3A, the brushless motor 2 rotates to generate an induced electromotive force and form a current pathway that flows back to the MOSFETs 12 through 14 for the lower arm and phase coils 2u, 2v, and 2w. An impedance component on the flow-back pathway consumes the current when phase coils 2u, 2v, and 2w of the brushless motor 2 are short-circuited. The consumed current generates a resisting force against the rotation of the brushless motor 2 to decelerate the revolution speed of the brushless motor 2.

According to the embodiment, the short-circuit brake not only turns on the MOSFETs 12 through 14 for the lower arm, but also periodically turns on and off the same. This performs the regeneration control over the power generated from the brushless motor 2. The description below explains the regeneration control in the short-circuit brake.

While the short-circuit brake is active, the IC 6 of the drive circuit 4 turns off all the MOSFETs 9 through 11 for the upper arm and periodically turns on and off the MOSFETs 12 through 14 for the lower arm by applying the same PWM signal of a predetermined frequency and a predetermined duty ratio. When the MOSFETs 12 through 14 for the lower arm turn on, as illustrated in FIG. 3A, the brushless motor 2 rotates to generate an induced electromotive force and allow a current to flow back to the MOSFETs 12 through 14 for the lower arm and phase coils 2u, 2v, and 2w. The current direction varies with the rotational position of the brushless motor 2.

The MOSFETs 12 through 14 for the lower arm may be simultaneously turned off subsequently. In this case, phase coils 2u, 2v, and 2w continue to allow the same current to flow. As illustrated in FIG. 3B, a new current pathway is formed so that the current flows through phase coils 2u, 2v, and 2w in the unchanged direction via the freewheeling diodes 15 through 20. Examples in FIGS. 3A and 3B are used for specific description. According to the example in FIG. 3A, the MOSFETs 12 through 14 for the lower arm turn on. The current flows from U-phase coil 2u and V-phase coil 2v of the brushless motor 2 to W-phase coil 2w via the MOSFETs 12 through 14 for the lower arm. When the MOSFETs 12 through 14 for the lower arm turn off, the current flows into U-phase coil 2u and V-phase coil 2v via the freewheeling diodes 18 and 19 for the lower arm and the current flows from W-phase coil 2w via the freewheeling diode 17 so that the current flows through the brushless motor 2 in the same direction.

At this time, the inverter 5 inside allows the flow of a current resulting from the energy stored in phase coils 2u, 2v, and 2w in addition to the induced electromotive force generated from the rotation of the brushless motor 2. Consequently, the brushless motor 2 can generate a large regenerative voltage and can charge the onboard battery 21 by using the current flowing via the freewheeling diode 17. The onboard battery 21 regenerates the power generated from the brushless motor 2 to decrease the revolution speed of the brushless motor 2.

With reference to FIGS. 4 through 10B, the description below explains how the short-circuit brake accompanied by the regeneration control changes phase currents Iu, Iv, and Iw flowing through phase coils 2u, 2v, and 2w and terminal voltages Vu, Vv, and Vw of phase coils 2u, 2v, and 2w.

Figure 4:
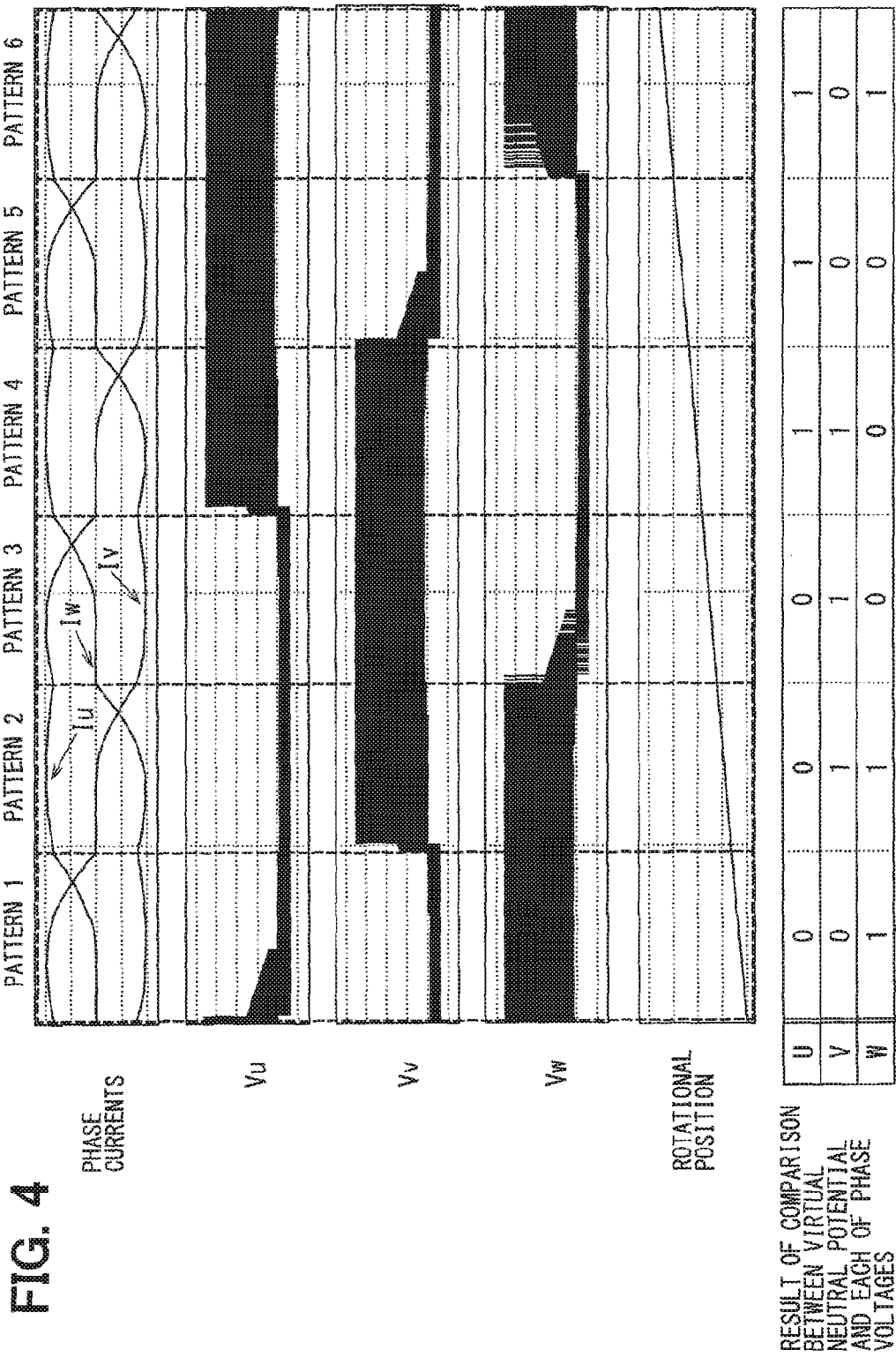
FIG. 4 illustrates changes in phase currents Iu, Iv, and Iw and terminal voltages Vu, Vv, and Vw when the brushless motor rotates at an electric angle of 360 degrees.

FIG. 4 illustrates changes in phase currents Iu, Iv, and Iw and terminal voltages Vu, Vv, and Vw when the brushless motor 2 rotates at the electric angle of 360 degrees. As illustrated in FIG. 4, changes in phase currents Iu, Iv, and Iw and terminal voltages Vu, Vv, and Vw can be divided into six patterns.

Figure 5:
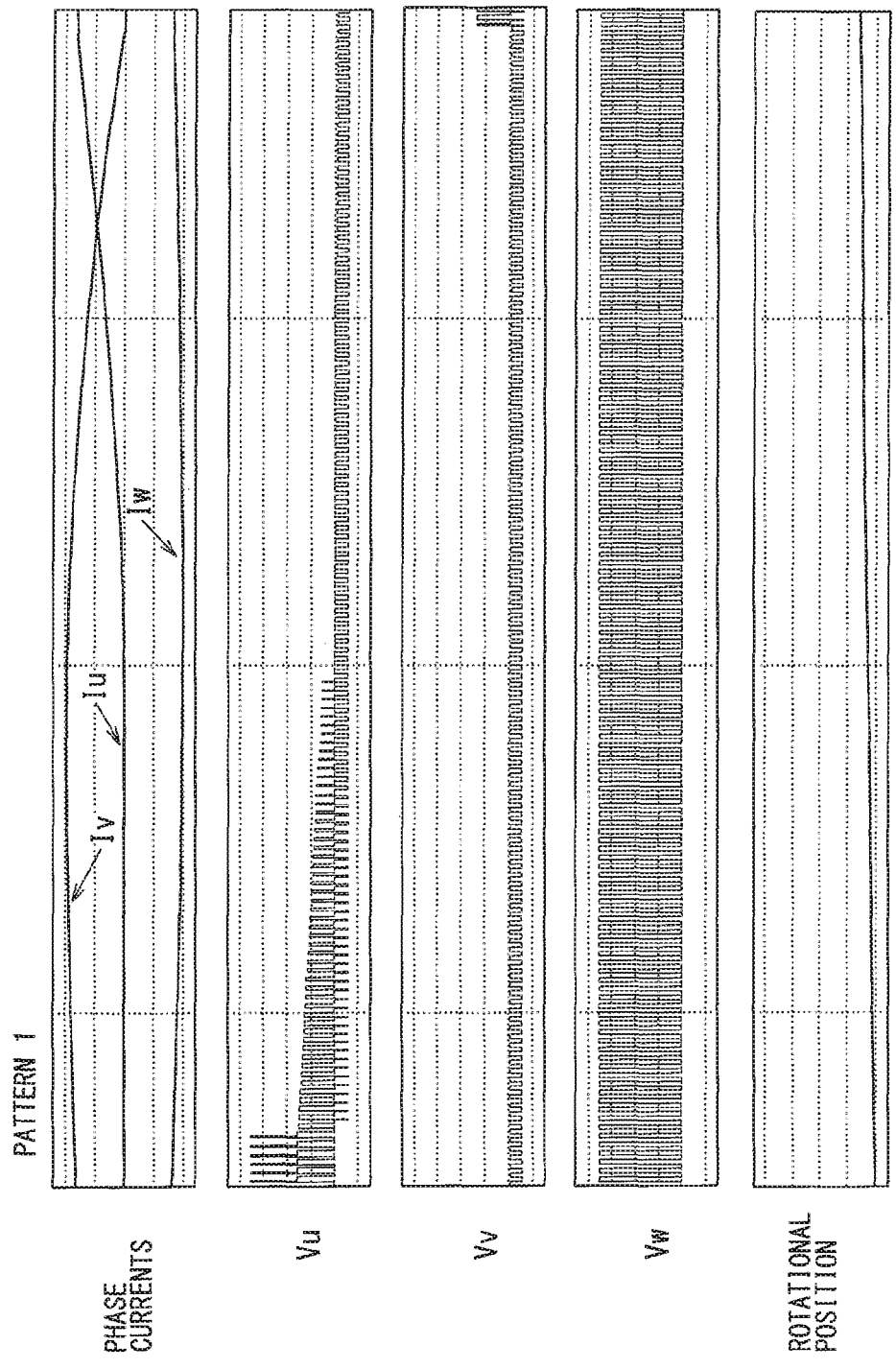
FIG. 5 is a diagram illustrating an enlarged view of changes in phase currents Iu, Iv, and Iw and terminal voltages Vu, Vv, and Vw during an interval of pattern 1 in FIG. 4.
Figure 6:
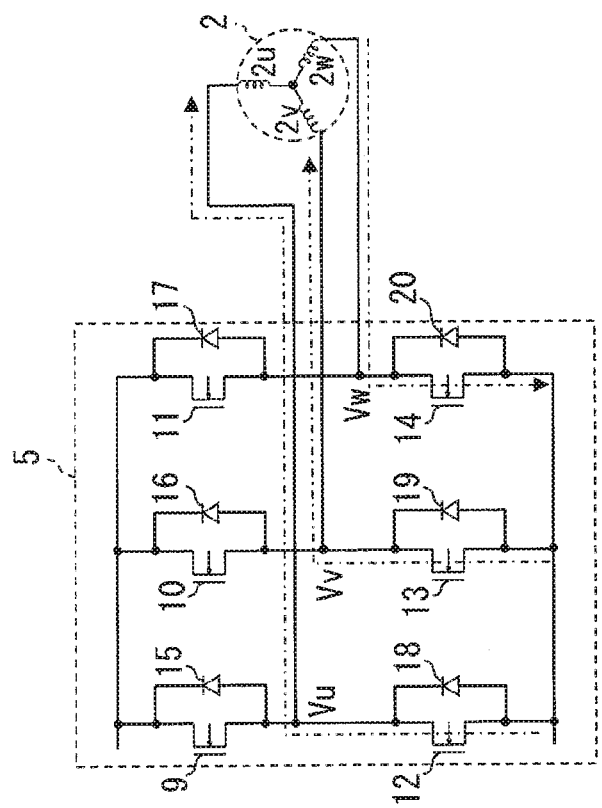
FIG. 6A is a diagram illustrating a pathway of a current flowing through a motor and an inverter in pattern 1 when MOSFET for the lower arm is turned on, and FIG. 6B is a diagram illustrating a pathway of a current flowing through the motor and the inverter when MOSFET for the lower arm is turned off from the state in FIG. 6A.

FIG. 5 is an enlarged view illustrating pattern 1 of the six patterns. According to pattern 1, turning on the MOSFETs 12 through 14 for the lower arm short-circuits phase coils 2u, 2v, and 2w. Terminal voltages Vu, Vv, and Vw change to the same potential (ground potential). FIG. 6A illustrates a pathway of a current flowing through the brushless motor 2 and the inverter 5 when the MOSFETs 12 through 14 for the lower arm are turned on according to pattern 1.

Turning off the MOSFETs 12 through 14 for the lower arm changes the current pathway as illustrated in FIG. 6B. In this case, suppose that Vf denotes a forward voltage for the freewheeling diodes 15 through 20 and VB denotes a battery voltage of the onboard battery 21. U-phase terminal voltage Vu and V-phase terminal voltage Vv equal −Vf. W-phase terminal voltage Vw equals VB+Vf. FIG. 4 illustrates a result of comparison between the virtual neutral potential and each of terminal voltages Vu, Vv, and Vw corresponding to the phases. The comparison result shows "0" for the U phase, "0" for the V phase, and "1" for the W phase.

Figure 7:
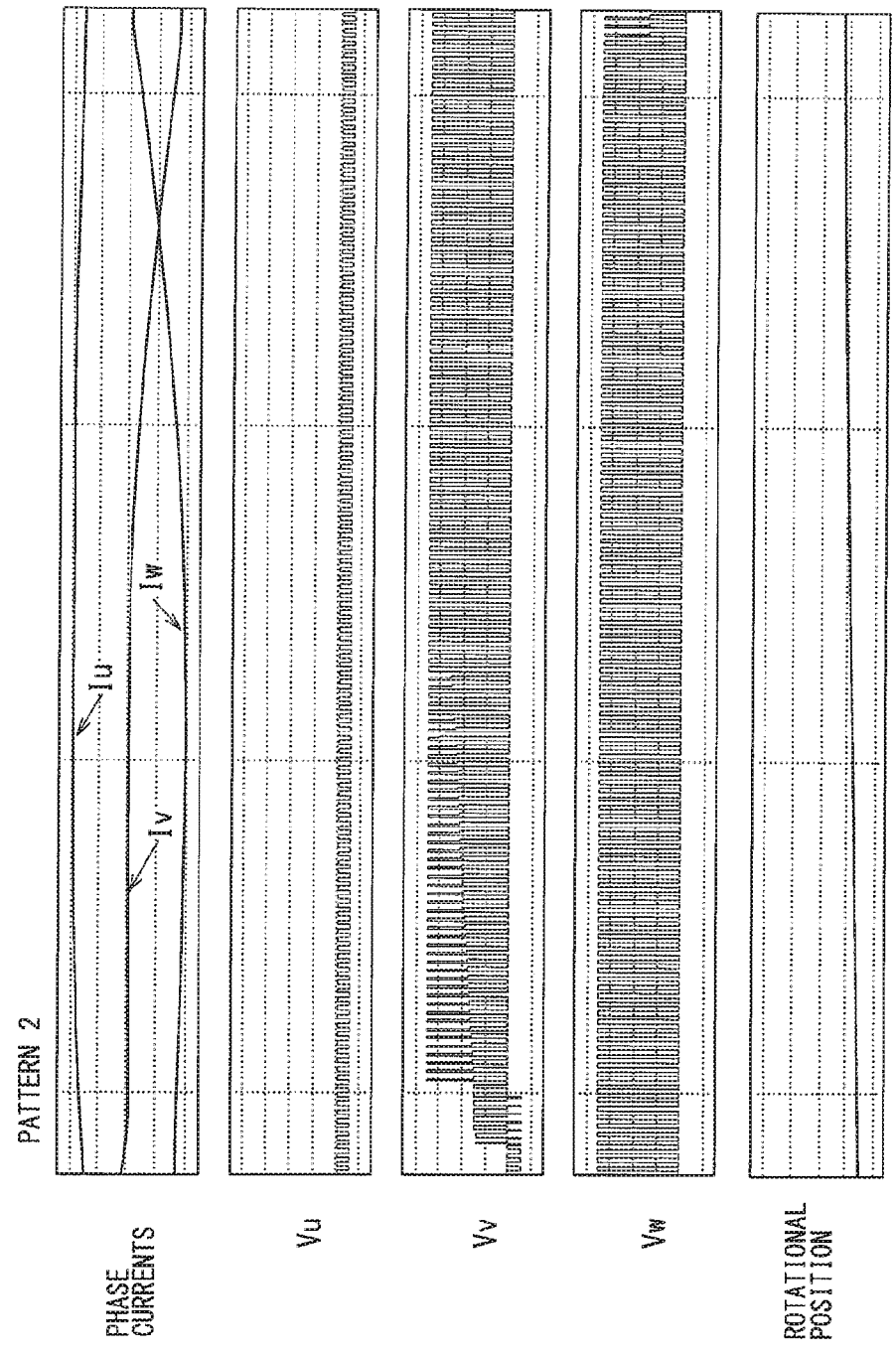
FIG. 7 is a diagram illustrating an enlarged view of changes in phase currents Iu, Iv, and Iw and terminal voltages Vu, Vv, and Vw during an interval of pattern 2 in FIG. 4.
Figure 8A:
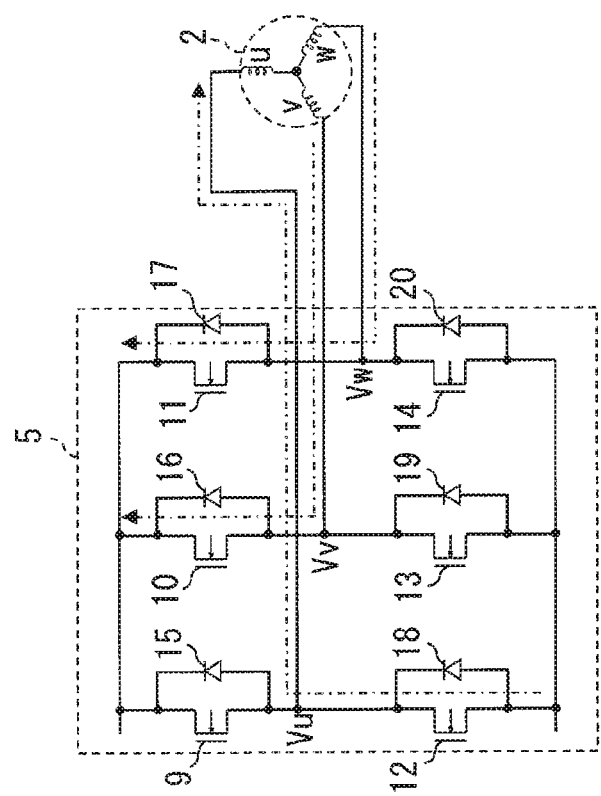
FIG. 8A is a diagram illustrating a pathway of a current flowing through the motor and the inverter in pattern 2 when MOSFET for the lower arm is turned on, and FIG. 8B is a diagram illustrating a pathway of a current flowing through the motor and the inverter when MOSFET for the lower arm is turned off from the state in FIG. 8A.

Pattern 2 will be described. FIG. 7 is an enlarged view of changes in phase currents Iu, Iv, and Iw, and terminal voltages Vu, Vv, and Vw in an interval of pattern 2. Similarly to FIG. 5, turning on the MOSFETs 12 through 14 for the lower arm short-circuits phase coils 2u, 2v, and 2w. Terminal voltages Vu, Vv, and Vw change to the same potential. FIG. 8A illustrates a pathway of a current flowing through the brushless motor 2 and the inverter 5 when the MOSFETs 12 through 14 for the lower arm are turned on according to pattern 2.

Figure 8B:
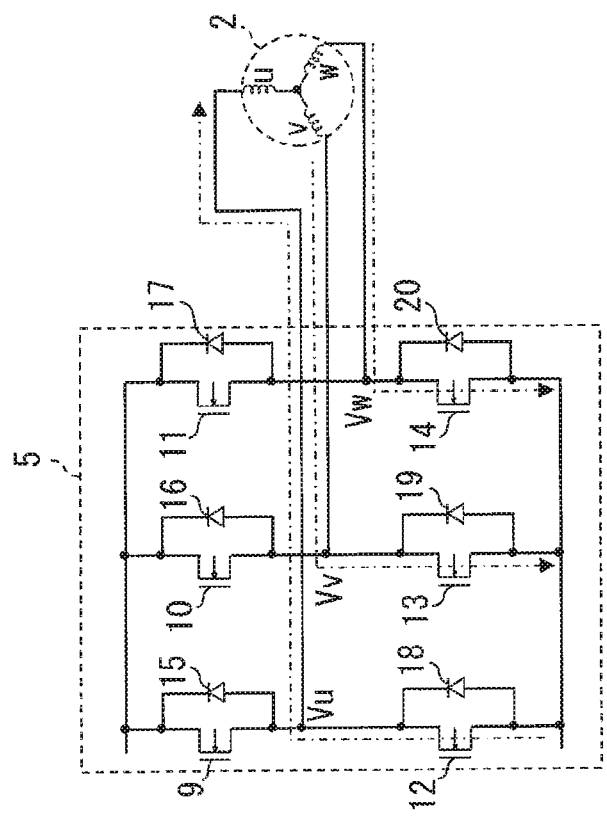

Turning off the MOSFETs 12 through 14 for the lower arm changes the current pathway as illustrated in FIG. 8B. U-phase terminal voltage Vu equals −Vf. V-phase terminal voltage Vv and W-phase terminal voltage Vw equal VB+Vf. FIG. 4 illustrates the result of comparison between the virtual neutral potential and each of terminal voltages Vu, Vv, and Vw corresponding to the phases. The comparison result shows "0" for the U phase, "1" for the V phase, and "1" for the W phase.

Figure 9:
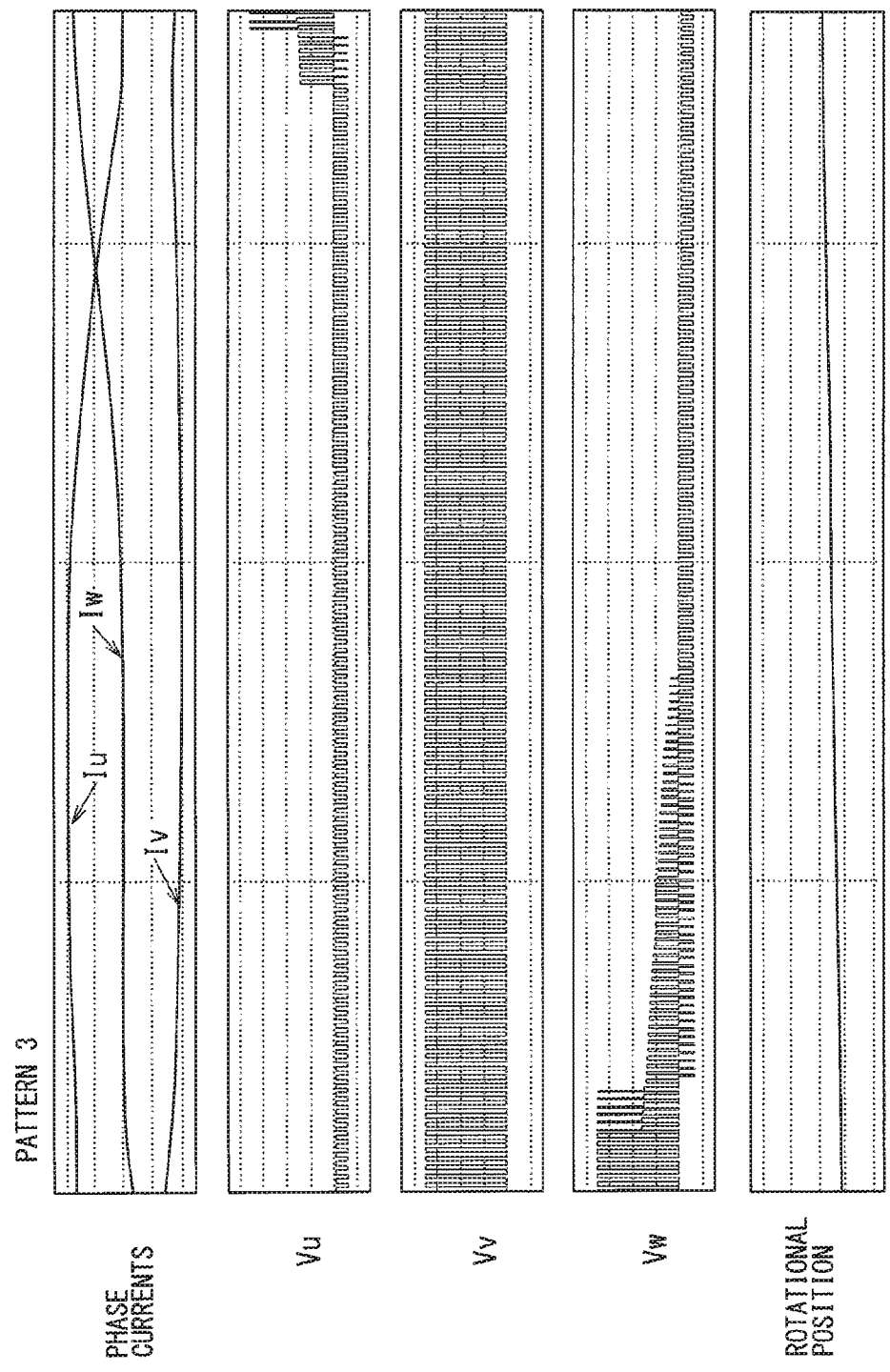
FIG. 9 is a diagram illustrating an enlarged view of changes in phase currents Iu, Iv, and Iw and terminal voltages Vu, Vv, and Vw during an interval of pattern 3 in FIG. 4.
Figure 10A:
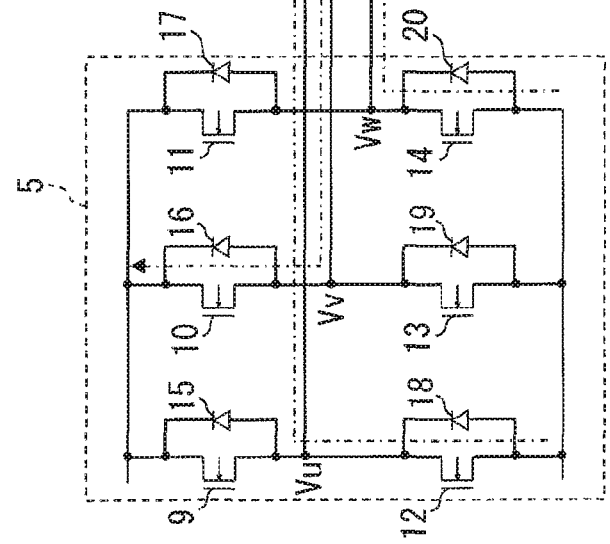
FIG. 10A is a diagram illustrating a pathway of a current flowing through the motor and the inverter in pattern 3 when MOSFET for the lower arm is turned on, and FIG. 10B is a diagram illustrating a pathway of a current flowing through the motor and the inverter when MOSFET for the lower arm is turned off from the state in FIG. 10A.

Pattern 3 will be described. FIG. 9 is an enlarged view of changes in phase currents Iu, Iv, and Iw, and terminal voltages Vu, Vv, and Vw in an interval of pattern 3. Similarly to FIG. 5, turning on the MOSFETs 12 through 14 for the lower arm short-circuits phase coils 2u, 2v, and 2w. Terminal voltages Vu, Vv, and Vw change to the same potential. FIG. 10A illustrates a pathway of a current flowing through the brushless motor 2 and the inverter 5 when the MOSFETs 12 through 14 for the lower arm are turned on according to pattern 3.

Figure 10B:
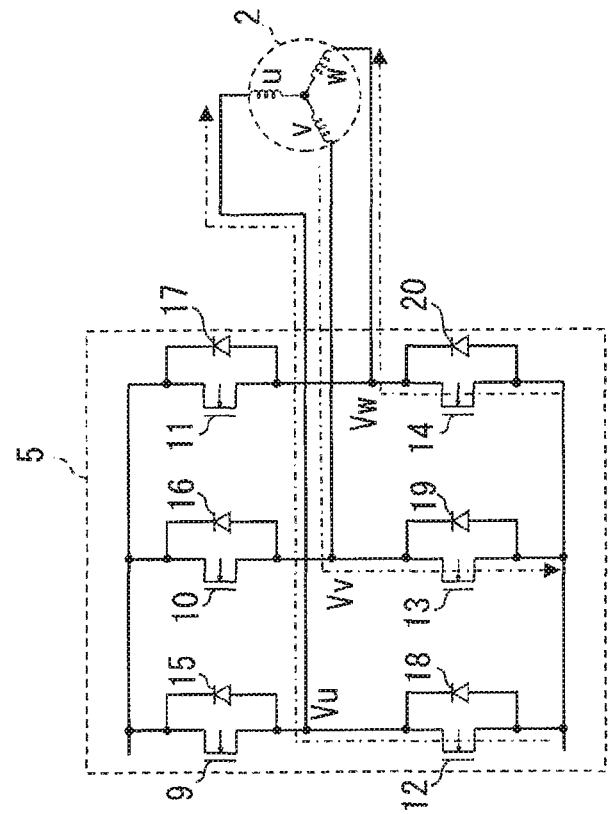

Turning off the MOSFETs 12 through 14 for the lower arm changes the current pathway as illustrated in FIG. 10B. U-phase terminal voltage Vu equals −Vf. V-phase terminal voltage Vv and W-phase terminal voltage Vw equal VB+Vf. FIG. 4 illustrates the result of comparison between the virtual neutral potential and each of terminal voltages Vu, Vv, and Vw corresponding to the phases. The comparison result shows "0" for the U phase, "1" for the V phase, and "0" for the W phase.

Patterns 4 through 6 can be explained similarly to patterns 1 through 3 above and a description about patterns 4 through 6 is omitted. FIG. 4 illustrates the result of comparison between the virtual neutral potential and each of terminal voltages Vu, Vv, and Vw corresponding to the phases for patterns 4 through 6.

When the brushless motor 2 rotates at the electric angle of 360 degrees, every rotation of the brushless motor 2 at 60 degrees changes the result of comparison between the virtual neutral potential and each of terminal voltages Vu, Vv, and Vw corresponding to the phases. A combination of comparison results depends on the rotational position of the brushless motor 2. Therefore, the rotational position of the brushless motor 2 can be detected from the result of comparison between the virtual neutral potential and each of terminal voltages Vu, Vv, and Vw corresponding to the phases.

The short-circuit brake periodically turns on and off the MOSFETs 12 through 14 for the lower arm. As above, a large regenerative voltage occurs when the MOSFETs 12 through 14 for the lower arm are turned off. In other words, turning off the MOSFETs 12 through 14 for the lower arm greatly changes terminal voltages Vu, Vv, and Vw corresponding to the phases. This can improve the accuracy of comparison performed by the comparator of the IC 6 between the neutral potential and each of terminal voltages Vu, Vv, and Vw.

As will be described later, it is favorable that the short-circuit brake performs the regeneration control when the ECU 3 does not input a directive to specify the target speed. The regeneration control can highly accurately detect a revolution speed and charge the onboard battery 21.

Figure 11:
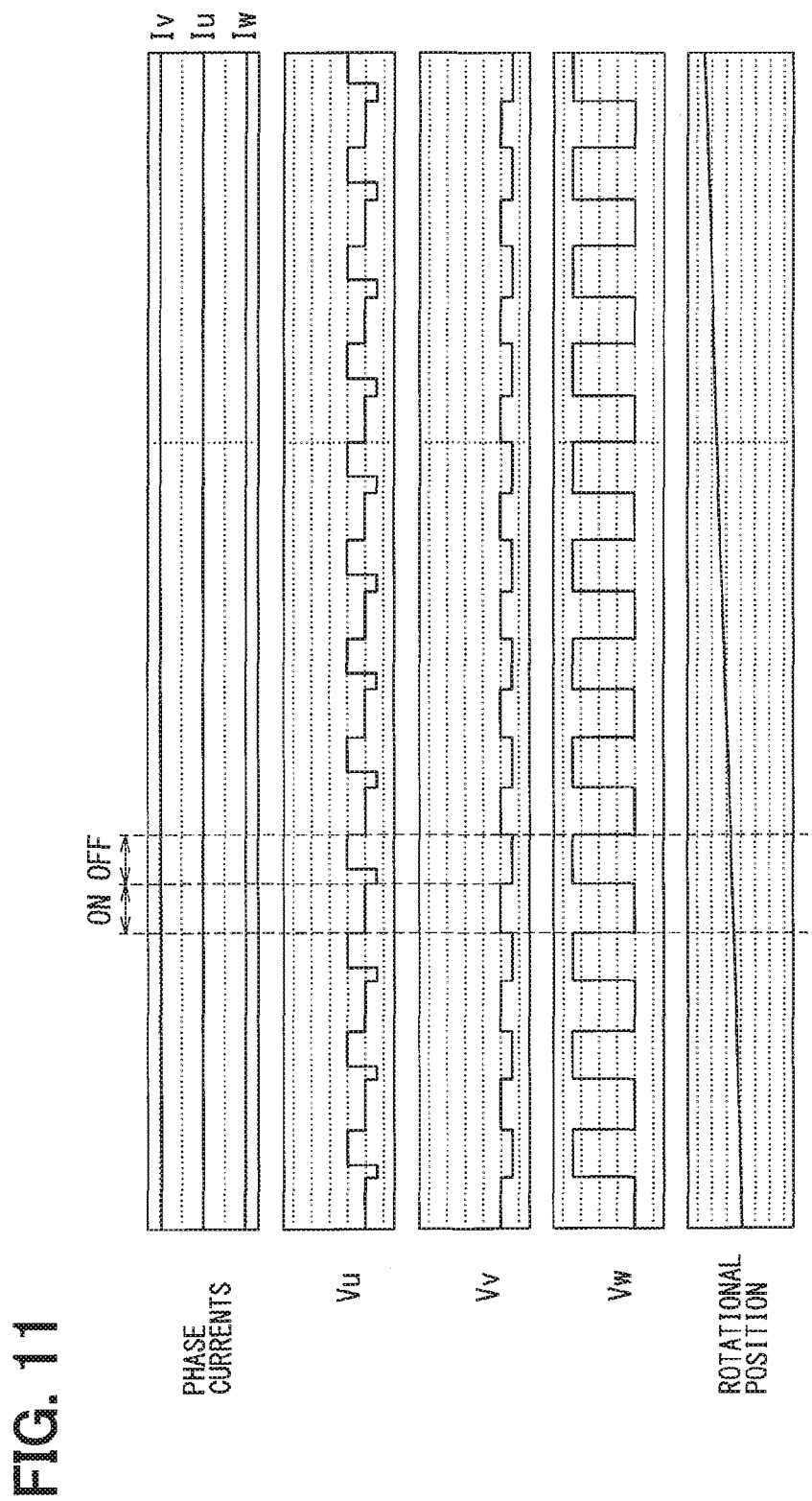
FIG. 11 is a diagram illustrating a timing to acquire output from a comparator that compares a terminal voltage for each phase with a virtual neutral potential.

Turning off the MOSFETs 12 through 14 changes terminal voltages Vu, Vv, and Vw corresponding to the phases when the short-circuit brake periodically turns on and off the MOSFETs 12 through 14 for the lower arm. The comparator performs comparison at this timing. As illustrated in FIG. 11, however, a voltage may change in progress immediately after the MOSFETs 12 through 14 are turned off. An incorrect comparison result may be output if the comparator performs comparison based on the voltage that is changed in progress.

After the MOSFETs 12 through 14 change from an on state to an off state, it is favorable to inhibit reading an output from the comparator for a predetermined time and read the output after a lapse of the predetermined time. It is also favorable to read a plurality of outputs from the comparator after a lapse of the predetermined time and calculate an average value.

Figure 2:
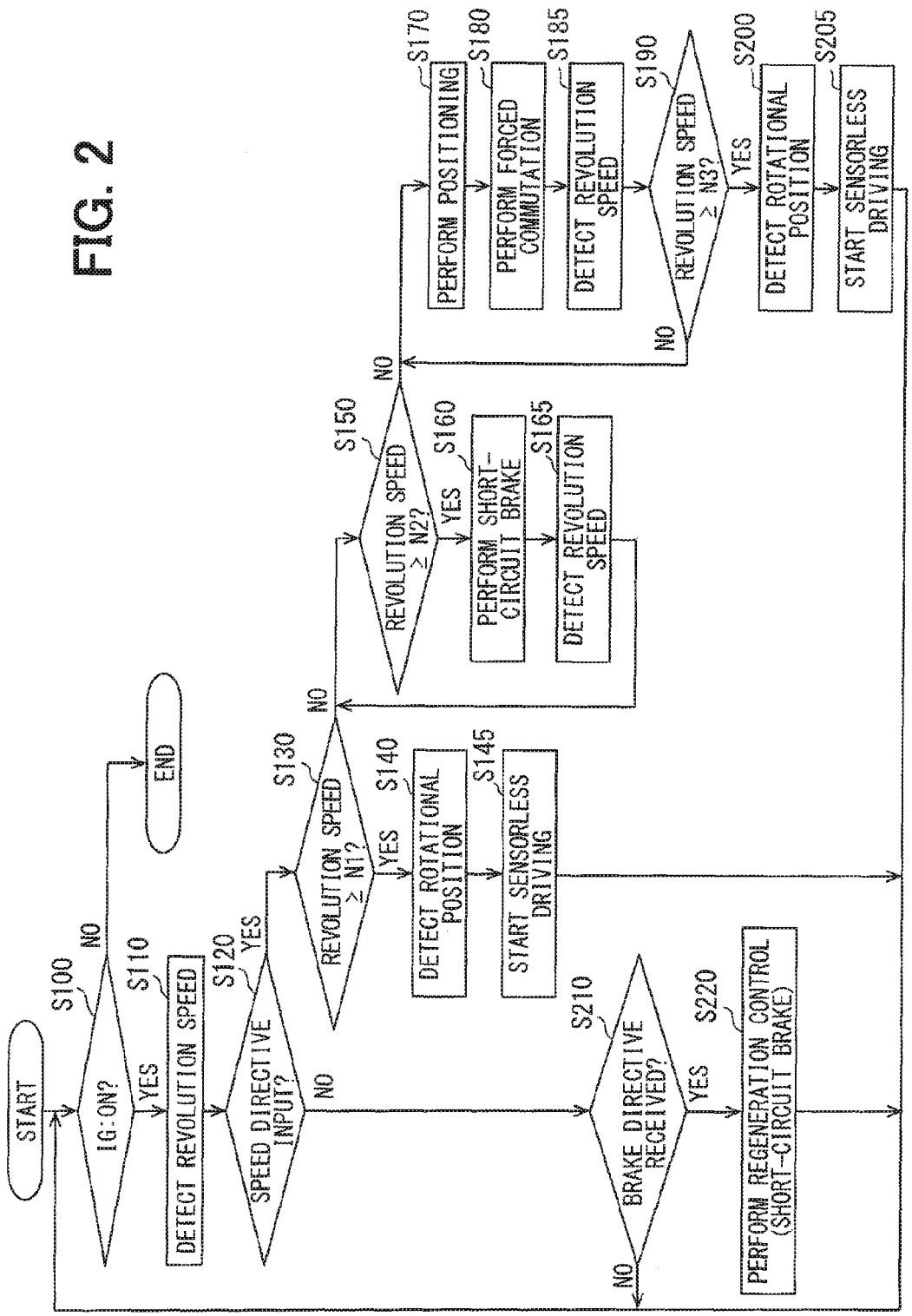
FIG. 2 is a flowchart illustrating a control process performed on the motor control device.

The description continues again with reference to the flowchart in FIG. 2.

At S170, the IC 6 performs the positioning control to energize two of the U, V, and W phases and forcibly place the rotational position of the rotor at a predetermined initial position. At S180, the IC 6 performs forced commutation drive to sequentially change energization patterns so that the rotor rotates from the initial position. The brushless motor 2 starts rotating and increases the revolution speed. At S185, the IC 6 detects the revolution speed increased by the forced commutation drive.

At S190, the IC 6 determines whether the revolution speed of the brushless motor 2 is higher than or equal to third predetermined revolution speed N3 in order to ensure that the revolution speed of the brushless motor 2 fully increases to be able to transition to the sensorless drive. Third predetermined revolution speed N3 may equal first predetermined revolution speed N1 or may differ from the same and may be provided as appropriate according to the forced commutation. If the determination at S190 results in "Yes," the IC 6 proceeds to the process at S200. If the determination at S190 results in "No," the forced commutation is highly likely to fail. The IC 6 returns to the positioning control at S170 and repeats the process.

At S200, the IC 6 detects the rotational position of the brushless motor 2 based on the comparison result from the comparator. At S205, the IC 6 starts the sensorless driving control on the brushless motor 2 based on the detected rotational position.

If the determination at S120 results in "No," the IC 6 proceeds to S210 and determines whether a brake directive is received from the ECU 3. The ECU 3 outputs the brake directive when the onboard battery 21 is not fully charged and the brushless motor 2 rotates, for example. If the determination at S210 results in "Yes," the IC 6 proceeds to S220 and performs the short-circuit brake including the regeneration control by periodically turning on and off the MOSFETs 12 through 14 for the lower arm as above. The short-circuit brake can decelerate the revolution speed of the brushless motor 2, regenerate the electric power, and improve the accuracy of detecting the revolution speed of the brushless motor 2.

While there have been described specific preferred embodiments of the present disclosure, it is to be distinctly understood that the present disclosure is not limited thereto but may be otherwise variously embodied within the spirit and scope of the disclosure.

In the above-mentioned embodiment, for example, there have been described the examples of detecting the revolution speed of the brushless motor 2 based on a temporal change in comparison results from the comparator and detecting the rotational position of the brushless motor 2 from a combination of comparison results from the comparator. The embodiment detects the revolution speed and the rotational position of the brushless motor 2 based on comparison results from the same comparator. However, a different configuration may be used to detect the revolution speed and the rotational position of the brushless motor 2. For example, the revolution speed of the brushless motor 2 may be detected from a cycle of changes in the current or the voltage on a bus line connected to the inverter 5 or may be detected from a fluctuation cycle of neutral potentials of the brushless motor 2.

The embodiment performs the short-circuit brake accompanied by the regeneration control in response to reception of the brake directive if a directive to specify the target speed is not supplied from the ECU 3. The regeneration control is not required and may be omitted.

In the above-mentioned embodiment, there has been described the example of performing the short-circuit brake accompanied by the power regeneration at S160 of the flowchart in FIG. 2. However, S160 may perform a short-circuit brake without power regeneration, namely, a short-circuit brake that continuously short-circuits the phase coils of the brushless motor.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A motor control device comprising:
a motor including a plurality of energization phases;
an inverter that individually controls energization of each of the energization phases for the motor; and
an integrated circuit that controls a rotation of the motor via the inverter, wherein:
the integrated circuit acts as:
a sensor-less detection device that detects a rotational position and a revolution speed of the motor;
a positioning control device that positions a rotor at a predetermined position by energizing a predetermined energization phase of the motor;
a deceleration device that decelerates the motor by short-circuiting a plurality of energization phases of the motor via the inverter; and
a determination device that determines whether the revolution speed of the motor detected by the detection device is higher than or equal to a first predetermined revolution speed or a second predetermined revolution speed, when rotating the motor at a predetermined target speed, the first predetermined revolution speed ensuring a predetermined accuracy of the rotational position for the detection device, and the second predetermined revolution speed, being used in determining whether a positioning control of the positioning control device is executed, is lower than the first predetermined revolution speed;
the motor control device starts controlling the motor to rotate at the target speed, according to the rotational position of the motor detected by the detection device, without executing the positioning control in the positioning control device when the determination device determines that the revolution speed of the motor is higher than or equal to the first predetermined revolution speed;

the motor control device controls the deceleration device to decelerate the motor when the determination device determines that the revolution speed of the motor is lower than the first predetermined revolution speed and higher than or equal to the second predetermined revolution speed; and the motor control device controls the positioning control device to start executing the positioning control when the determination device determines that the revolution speed of the motor is lower than the second predetermined revolution speed.

2. The motor control device according to claim 1, wherein:

the deceleration device decelerates the motor by short-circuiting intermittently the plurality of energization phases of the motor via the inverter; and the detection device detects the rotational position and a numerical number of revolutions of the motor based on a current or a voltage generated from each energization phase of the motor when the deceleration device stops short-circuiting.

3. The motor control device according to claim 2, wherein:

the second predetermined revolution speed is set to be lower than or equal to a revolution speed that prevents a demagnetizing current from flowing through the motor even when the positioning control device executes the positioning control.

4. The motor control device according to claim 1, wherein:

the motor drives a fan; and the control device controls the deceleration device to decelerate the motor when the fan rotates due to a wind hitting the fan.

5. The motor control device according to claim 1, wherein:

the inverter comprises a plurality of switching devices, each switching device connected in parallel to a respective freewheeling diode;

the deceleration device periodically turns on and off a part of the switching devices in order to decelerate the motor;

when turning on the part of the switching devices, the plurality of energization phases of the motor short-circuit, and the motor decelerates; and when turning off the part of the switching devices, a current flows into an electric storage device connected to the inverter through the freewheeling diode, and an electric power is regenerated.

6. The motor control device according to claim 5, wherein:

the part of the switching devices, which the deceleration device periodically turns on and off, is a switching device connected to a low side of the switching devices for providing the inverter.

7. The motor control device according to claim 6, wherein:

the detection device includes a comparison device that compares a neutral potential for the plurality of energization phases of the motor with a voltage applied to each energization phase; and the detection device detects the rotational position and the revolution speed of the motor based on a combination of comparison results in the comparison device.

8. The motor control device according to claim 7, wherein:

the detection device acquires a comparison result from the comparison device after a predetermined time has elapsed from when the part of the switching devices turns off.

9. The motor control device according to claim 5, wherein:

the part of the switching devices, which the deceleration device periodically turns on and off, is a switching device connected to a high side of the switching devices for providing the inverter.

10. The motor control device according to claim 1, wherein:

the positioning control places the rotor at a predetermined initial position and performs forced commutation thereby rotating the rotor from the predetermined initial position.

* * * * *